G. SCHMIDT.
TANK VALVE MECHANISM.
APPLICATION FILED SEPT. 23, 1916.
1,243,766.
Patented Oct. 23, 1917.
2 SHEETS—SHEET 1.
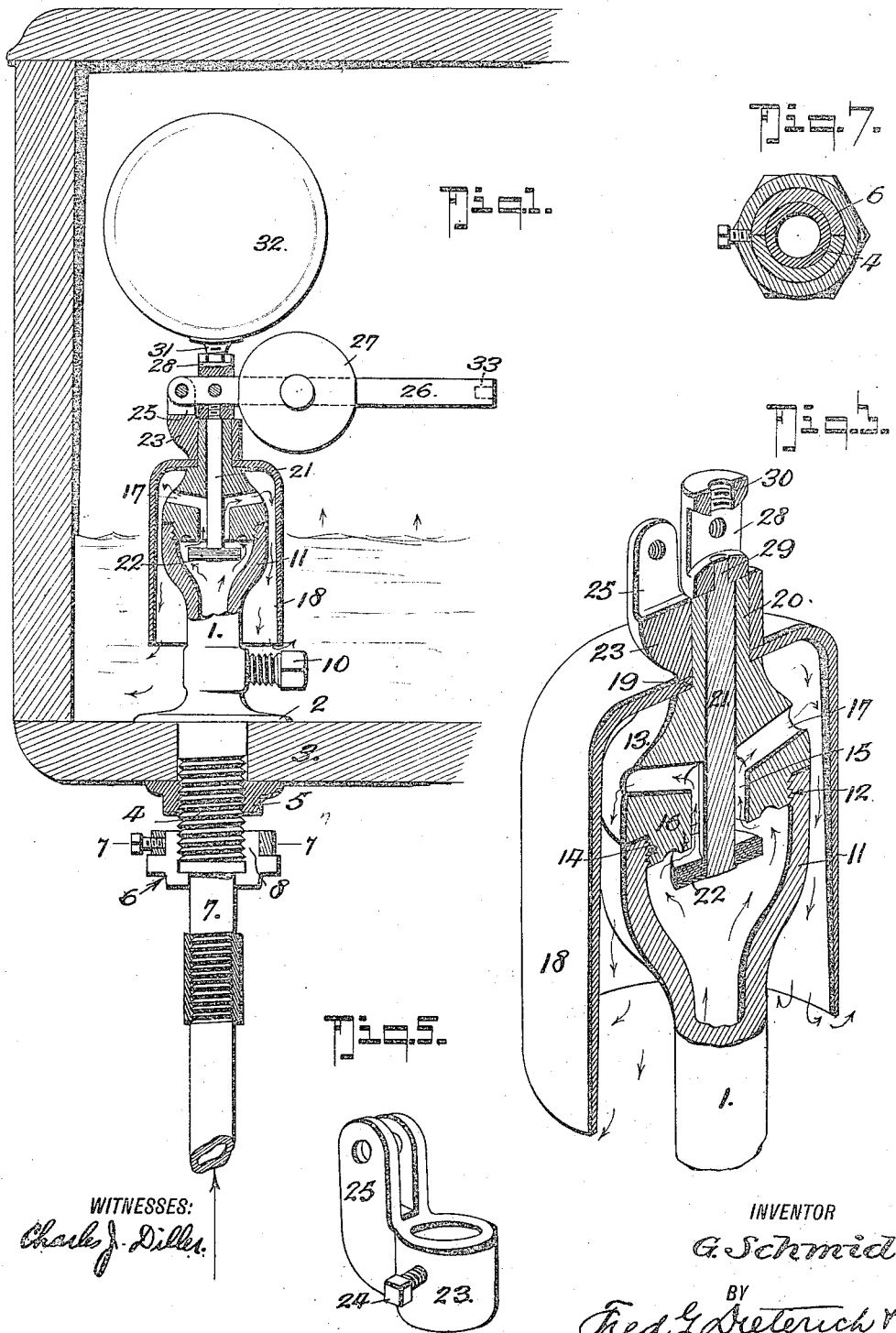
WITNESSES:
Charles J. Diller
INVENTOR
G. Schmidt
BY
Fred J. Dieterich & Co.
ATTORNEYS

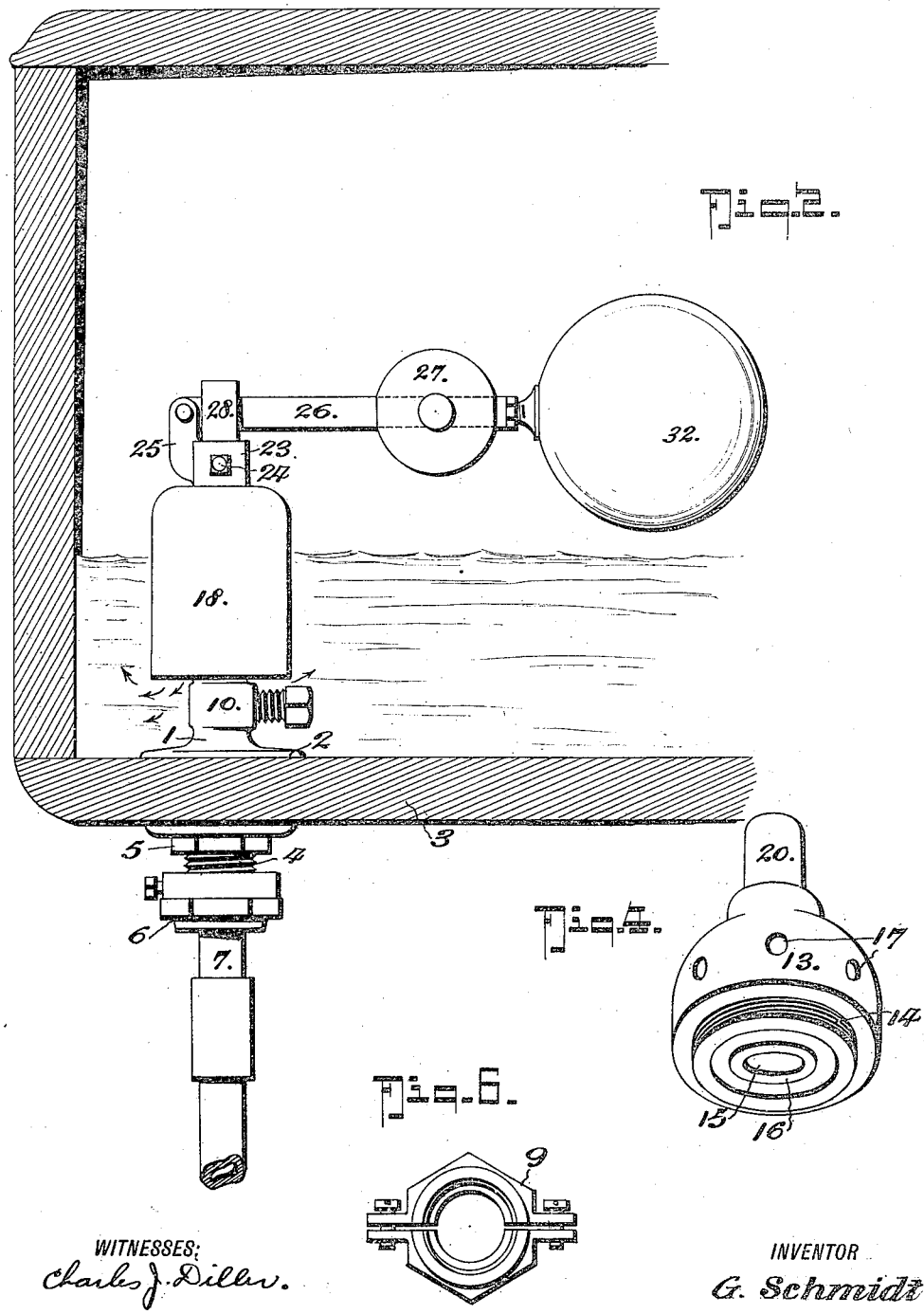

UNITED STATES PATENT OFFICE.

GOTTFRIED SCHMIDT, OF HAZLETON, PENNSYLVANIA.

TANK VALVE MECHANISM.

1,243,766. Specification of Letters Patent. Patented Oct. 23, 1917.

Application filed September 23, 1916. Serial No. 121,777.

*To all whom it may concern:*

Be it known that I, GOTTFRIED SCHMIDT, residing at Hazleton, in the county of Luzerne and State of Pennsylvania, have invented a new and Improved Tank Valve Mechanism, of which the following is a specification.

This invention has reference to improvements in valve mechanism particularly designed for use in connection with toilet tanks, expansion tanks and the like, in which means are included for automatically cutting off the fluid feed when the water in the tank reaches a predetermined height.
Among other objects, my invention has for its purpose to provide an improved construction of valve mechanism of the general character stated, in which the parts are particularly designed for a noiseless flushing of the tank and without splashing the water fed into and contained within the tank.

My invention also seeks to provide, in a valve mechanism, as stated, a shiftable float connection that may be readily adjusted to adapt the same for use under a high or a low fluid pressure; the valve mechanism also including coöperative connections whereby the infeed member may be readily closed while the operative parts are being repaired.
Again, my invention seeks to provide in a valve mechanism, certain details of structure and peculiar combination of parts hereinafter explained, specifically pointed out in the appended claims and illustrated in the accompanying drawings, in which:

Figure 1 is a vertical section of my improved valve mechanism, the same being shown as operatively applied in a toilet tank, the float being adjusted for operating under a high fluid pressure, so much of the toilet tank being shown as is necessary to illustrate the practical application of my invention.

Fig. 2 is a side elevation of my valve mechanism, the same being shown as applied for use in an expansion tank.

Fig. 3 is a perspective view, parts being in vertical section of the fluid distributing head and the control valve that coöperates therewith.

Fig. 4 is a detail perspective view of the upper section of the distributing head having the valve seat.

Fig. 5 is a detail perspective view of the rotatably adjustable bracket for the weighted float arm.

Fig. 6 is a detail view of a split coupling connection for the said feed pipe and hereinafter again referred to.

Fig. 7 is a detail section on the line 7—7 of Fig. 1.

In the practical arrangement my improved valve includes a tubular extension of the infeed pipe 1, the lower end of which has an annular collar 2 for engaging the bottom 3 of the tank and which terminates in a threaded portion 4 for receiving the nut 5 that clamps against the underside of the clamp as shown.

A union coupling 6 is provided for connecting the supply pipe 7 with the threaded portion 4 of the valve body and which may include a two-part clamp 8, as shown in Fig. 1, or a split coupling 9, as shown in Fig. 7.

10 designates a screw plug that engages the tubular shank and which, when it is screwed home, serves to cut off the fluid supply and thereby permits of freely making the necessary repairs to the valve elements.

The upper end of the tubular member terminates in a cup or annular head section 11, the said head section 11 being formed with an internal screw threaded portion 12.

13 designates what I term an upper head section or dome member, and the same includes an annular base portion 14 which is externally threaded to fit the threaded portion of the section 11.

The base portion 14 of the upper head has a fluid passage 15, provided with a surrounding valve seat 16 at the inlet end, and the dome portion has a series of fluid outlets 17, as is clearly shown in Figs. 1 and 3.

18 designates what I term a deflecting hood and is preferably in the nature of an inverted elongated sheet metal cup having an aperture 19 in its top, whereby it can be readily slipped over a short tubular extension 20 projected from the top of the dome and in which plays a stem 21 of a valve 22 that is provided for closing against the valve seat 16 when the valve is lifted at a predetermined time in the manner presently explained.

The hood 18 is of such depth, relatively to the distributing head portion on the tubular stem 20, that its lower edge extends some distance below the distributing head, and at this point it should be stated, in fitting the valve either in a toilet tank, as shown in Fig 1, or in an expansion tank, as shown in Fig. 2, the distributing head is so located near the tank bottom that the lower edge of the hood is almost constantly submerged by the water as it collects in the tank and thereby renders the feeding of the tank a practically noiseless operation, while at all times it prevents splashing as the water discharges through the openings in the distributing head, it being understood that when the valve 22 has opened, the water that passes up through the tubular shank rises under force into the hollow head or dome and sprays out through the openings in the said dome and striking against the hood, is deflected toward the lower edge thereof, as is clearly indicated in Fig. 1 of the drawing.

A bracket is mounted on the extension 20 and it includes a tubular member 23 that rotatably engages the said extension and is adapted for being held to any of its adjustments by a set screw 24.

The bracket also includes a slotted standard 25 for pivotally receiving the inner end of a lever 26. 27 is a small weight that is adjustably mounted on the lever and has for its purpose to regulate the water pressure and, at the same time, prevent hammering when the valve is operating under a high force of water.

The lever 26 passes through a slotted cap member 28 that is threaded onto a screw stud 29 on the upper end of the valve stem and it has a screw threaded opening 30 at the upper end for receiving the screw shank of a bearing portion 31 to which is attached a float 32 of glass, or other suitable material.

33 designates a screw tap on the outer end of the lever 26, the purpose of which will presently appear.

By reason of the peculiar construction and coöperative arrangement of the parts shown and described, I have provided a simple and effective tank valve in which provision is made for rendering the operation of feeding the tank practically noiseless and for setting the weighted lever 26 in any horizontal direction desired and also for readily disconnecting the operating parts when repairs are necessary.

Again, the construction shown is such that a single float can be used and connected to operate to lift the valve under a direct action when the valve is operating under a low pressure or detached from such position and connected with the outer end of the weighted lever when the valve is operating under high pressure.

While I have shown and described the deflector hood as made of sheet metal, it may be of glass or any other suitable material.

By providing the lever 26 with a weight, as shown, the said lever tends to keep the valve down to the open position until the tank fills.

What I claim is:

1. A tank valve comprising a tubular standard adapted for connection with a fluid supply pipe, a head portion that includes a top member having lateral outlets, a fluid passage to the said outlets in communication with the tubular standard, a valve for controlling the said passage, a lifting rod for the valve, a head detachably connected to the said lifting rod, a detachably mounted pivoted lever in coöperative connection with the head and a float interchangeably connectible either directly to the said head or to the outer end of said lever, and a weight adjustably mounted on the said lever.

2. In a tank valve of the character stated, the combination with a tank and a fluid supply pipe therefor; of a tubular standard, means for maintaining the standard on the tank bottom, other means for connecting said standard with the fluid supply pipe, a cup shaped head portion on the upper end of the standard, said head portion having an internally threaded rim, an upper head portion having a threaded base for engaging the threaded rim of the cup shaped head portion, said upper head portion having lateral fluid outlets, and a fluid passage that joins the outlets and the tubular standard, a valve for controlling the said fluid passage, the said upper head portion having a vertically extended tubular member, a bracket rotatably mounted on the said tubular member, a lifting rod attached to the valve that passes up through the said tubular member, a slotted cap attached to the upper end of the rod, a weighted lever that passes through the slotted cap and pivotally connects with the bracket and a float interchangeably connectible either directly with the slotted cap or with the lever.

3. In a valve of the character stated, the combination with a tank and a fluid supply pipe therefor; of a tubular standard mounted upon the tank bottom, and connected with the fluid supply pipe, a fluid cut off valve in the said standard, said standard including a cup shaped head portion having an internally threaded rim, an upper head portion having a threaded base for engaging the threaded rim of the cup shaped head portion, said upper head portion having laterally extended fluid outlets, and a fluid passage that joins the outlets with the tubular standard, a valve for controlling the said fluid passage, the said upper head portion having a vertically extended tubular member, an open bottom deflecting head mounted upon the said tubular member and having its lower open edge extended below the head portion of the standard, a bracket rotatably mounted on the said tubular member, a lifting rod attached to the rod that passes up through the said tubular member, a slotted cap removably attached to the upper end of the rod, a weighted lever that passes through the slotted cap and is pivotally connected with the rotatable bracket, and a float interchangeably connectible either directly with the slotted cap or with the lever.

4. In a valve for flush tanks, a casing that includes a head portion having a fluid passage and outlets in communication with the passage, a valve for controlling the passage, the said valve including a lift rod that projects above the head portion, a pivoted lifting lever connected with the rod, said rod including a head portion, a float, said float, the rod head portion and the lever having coupling means whereby the said float is interchangeably connectible with the rod head portion or the lever.

5. In a valve for flush tanks, a tubular standard that includes a flange that is adapted to engage the bottom of a tank and a pendent threaded portion adapted to project through the tank bottom for connecting with the fluid supply pipe, the said standard also including a head portion formed of an upper and lower part, the upper one of which has a fluid passage and outlets in communication with the passage, a float controlled valve mechanism for regulating the fluid passage to the said outlets, the said mechanism including a valve that operates in the lower head portion for closing off the passage to the upper head portion, a rod that works through the upper head portion, a member rotatably mounted on the upper head portion through which the valve rod passes, the said member including an apertured bracket, a slotted member secured to the upper end of the valve rod, a lever, one end of which passes through the said slotted member and is pivotally connected therewith and has its adjacent end pivoted in the apertured bracket on the rotatable member, a float, and coöperating means on the float, the free end of the lever and the upper end of the slotted member on the valve rod for interchangeably securing the float either on the lever or on the upper end of the slotted member on the valve rod.

GOTTFRIED SCHMIDT.

Copies of this patent may be obtained for five cents each, by addressing the "Commissioner of Patents, Washington, D. C."